United States Patent [19]

Paik et al.

[11] Patent Number: 5,233,629
[45] Date of Patent: Aug. 3, 1993

[54] METHOD AND APPARATUS FOR COMMUNICATING DIGITAL DATA USING TRELLIS CODED QAM

[75] Inventors: Woo H. Paik, Encinitas; Scott A. Lery, Leucadia, both of Calif.; Chris Heegard, Ithaca, N.Y.

[73] Assignee: General Instrument Corporation, Hatboro, Pa.

[21] Appl. No.: 736,738

[22] Filed: Jul. 26, 1991

[51] Int. Cl.⁵ ............................................ H03M 13/12
[52] U.S. Cl. ..................................... 375/39; 371/37.8; 371/43; 332/103; 329/304
[58] Field of Search ........................ 375/38, 39, 40, 62, 375/79, 83; 371/37.5, 37.8, 43; 332/103; 329/304

[56] References Cited

U.S. PATENT DOCUMENTS

| | | | |
|---|---|---|---|
| 4,483,012 | 11/1984 | Wei | 375/39 |
| 4,586,182 | 4/1986 | Gallager | 371/43 |
| 4,601,044 | 7/1986 | Kromer, III et al. | 371/43 |
| 4,660,214 | 4/1987 | Pahlavan et al. | 371/43 |
| 5,023,889 | 6/1991 | Divsalar et al. | 371/43 |
| 5,054,036 | 10/1991 | Brownlie et al. | 375/39 |
| 5,115,453 | 5/1992 | Calderbank et al. | 332/103 |

OTHER PUBLICATIONS

Viterbi, et al., "A Pragmatic Approach to Trellis--Coded Modulation", *IEEE Communications Magazine*, Jul. 1989, pp. 11–19.

Odenwalder, J. P., *Error Control Coding Handbook*, Section 7.1, "Viterbi-Decoded Convolutional Inner Code and Reed-Solomon Outer Code", Linkabit Corporation, 1976.

*Primary Examiner*—Curtis Kontz
*Assistant Examiner*—Young Tse
*Attorney, Agent, or Firm*—Barry R. Lipsitz

[57] ABSTRACT

Coded modulation schemes based on codes for QPSK modulation are directly incorporated into QAM based modulation systems, forming trellis coded QAM for communicating information. Concatenated coding with QPSK based trellis coding and symbol error correcting coding is used. In an encoder, an N-bit QAM constellation pattern is divided into four subsets, each including N/4 symbol points of the constellation pattern. A two-bit QPSK codeword is assigned to each of the four subsets. A symbol to be transmitted is first encoded using an outer error correcting encoding algorithm. Part of the symbol is then encoded with an inner code that comprises a rate ½ trellis encoding algorithm to provide a QPSK codeword, which is mapped with the remaining bits of the symbol to provide a modulation function. The remaining bits correlate the symbol with one of the symbol points included in the subset defined by the QPSK codeword. A receiver is provided to recover information from the modulation function.

19 Claims, 4 Drawing Sheets

METHOD AND APPARATUS FOR COMMUNICATING DIGITAL DATA USING TRELLIS CODED QAM

BACKGROUND OF THE INVENTION

The present invention relates to trellis coded quadrature amplitude modulation (QAM) and more particularly to a practical method for coding QAM transmission.

Digital data, for example digitized video for use in broadcasting high definition television (HDTV) signals, can be transmitted over terrestrial VHF or UHF analog channels for communication to end users. Analog channels deliver corrupted and transformed versions of their input waveforms. Corruption of the waveform, usually statistical, may be additive and/or multiplicative, because of possible background thermal noise, impulse noise, and fades. Transformations performed by the channel are frequency translation, nonlinear or harmonic distortion and time dispersion.

In order to communicate digital data via an analog channel, the data is modulated using, for example, a form of pulse amplitude modulation (PAM). Typically, quadrature amplitude modulation (QAM) is used to increase the amount of data that can be transmitted within an available channel bandwidth. QAM is a form of PAM in which a plurality of bits of information are transmitted together in a pattern referred to as a "constellation" that can contain, for example, sixteen or thirty-two points.

In pulse amplitude modulation, each signal is a pulse whose amplitude level is determined by a transmitted symbol. In 16-bit QAM, symbol amplitudes of $-3, -1, 1$ and $3$ in each quadrature channel are typically used. Bandwidth efficiency in digital communication systems is defined as the number of transmitted bits per second per unit of bandwidth, i.e., the ratio of the data rate to the bandwidth. Modulation systems with high bandwidth efficiency are employed in applications that have high data rates and small bandwidth occupancy requirements. QAM provides bandwidth efficient modulation.

On the other hand, modulation schemes such as quadrature phase shift keying (QPSK), commonly found in satellite transmission systems, are well established and understood. In QPSK, a more simple constellation pattern than that provided in QAM results. In particular, QPSK systems use a constellation pattern having only four symbols that are typically positioned 90 degrees apart from each other in phase, but have the same amplitude. Thus, the four symbols are equally spaced about a circle.

QPSK modulation is suitable for power limited systems where bandwidth limitations are not a major concern. QAM modulation, on the other hand, is advantageous in bandwidth limited systems, where power requirements do not present a major problem. Therefore, QPSK has been the system of choice in satellite communication systems, whereas QAM is preferred in terrestrial and cable systems. As a consequence of the popularity of QPSK, integrated circuits that realize trellis coded QPSK modulation are readily available and easily obtained.

Trellis coded modulation (TCM) has evolved as a combined coding and modulation technique for digital transmission over band limited channels. It allows the achievement of significant coding gains over conventional uncoded multilevel modulation, such as QAM, without compromising bandwidth efficiency. TCM schemes utilize redundant nonbinary modulation in combination with a finite-state encoder which governs the selection of modulation signals to generate coded signal sequences. In the receiver, the noisy signals are decoded by a soft-decision maximum likelihood sequence decoder. Such schemes can improve the robustness of digital transmission against additive noise by 3-6 dB or more, compared to conventional uncoded modulation. These gains are obtained without bandwidth expansion or reduction of the effective information rate as required by other known error correction schemes. The term "trellis" is used because these schemes can be described by a state-transition (trellis) diagram similar to the trellis diagrams of binary convolutional codes. The difference is that TCM extends the principles of convolutional coding to nonbinary modulation with signal sets of arbitrary size.

The availability of components for implementing trellis coded QPSK modulation is a significant advantage in designing low cost communication systems for applications, such as satellite communications, wherein QPSK techniques excel. However, such components have not been of assistance in implementing other coded transmission systems, such as those in which QAM is preferred.

For applications that are both power limited and band limited, and require low cost components (particularly low cost data decoders), conventional QAM systems have not been feasible due to the complexity and relatively high cost of the required encoder and decoder circuits. In fact, it is typical to implement QAM trellis encoders and decoders in expensive custom integrated circuit chips.

One power limited and band limited application in which a low cost solution is necessary for communicating digital data is the digital communication of compressed high definition television signals. Systems for transmitting compressed HDTV signals have data rate requirements on the order of 15-20 megabits per second (Mbps), bandwidth occupancy requirements on the order of 5-6 MHz (the bandwidth of a conventional National Television System Committee (NTSC) television channel), and very high data reliability requirements (i.e., a very small bit error rate). The data rate requirement arises from the need to provide a high quality compressed television picture. The bandwidth constraint is a consequence of the U.S. Federal Communications Commission requirement that HDTV signals occupy existing 6 MHz television channels, and must coexist with the current broadcast NTSC signals. This combination of data rate and bandwidth occupancy requires a modulation system that has high bandwidth efficiency. Indeed, the ratio of data rate to bandwidth must be on the order of 3 or 4. This means that modulation systems such as QPSK, having a bandwidth efficiency without coding of two, are unsuitable. A more bandwidth efficient modulation, such as QAM is required. However, as noted above, QAM systems have been too expensive to implement for high volume consumer applications.

The requirement for a very high data reliability in the HDTV application results from the fact that highly compressed source material (i.e., the compressed video) is intolerant of channel errors. The natural redundancy of the signal has been removed in order to obtain a concise description of the intrinsic value of the data.

For example, for a system to transmit at 15 Mbps for a twenty-four hour period, with less than one bit error, requires the bit error rate (BER) of the system to be less than one error in $10^{12}$ transmitted bits.

Data reliability requirements are often met in practice via the use of a concatenated coding approach, which is a divide and concur approach to problem solving. In such a coding framework, two codes are employed. An "inner" modulation code cleans up the channel and delivers a modest symbol error rate to an "outer" decoder. The inner code is usually a coded modulation that can be effectively decoded using "soft decisions" (i.e., finely quantized channel data). A known approach is to use a convolutional or trellis code as the inner code with some form of the "Viterbi algorithm" as a trellis decoder. The outer code is most often a t error-correcting, "Reed-Solomon" code. Such Reed-Solomon coding systems, that operate in the data rate range required for communicating HDTV data, are widely available and have been implemented in the integrated circuits of several vendors. The outer decoder removes the vast majority of symbol errors that have eluded the inner decoder in such a way that the final output error rate is extremely small.

A more detailed explanation of concatenated coding schemes can be found in G. C. Clark, Jr. and J. B. Cain, "Error-Correction Coding for Digital Communications", Plenum Press, New York, 1981; and S. Lin and D. J. Costello, Jr., "Error Control Coding: Fundamental and Applications", Prentice-Hall, Englewood Cliffs, N.J., 1983. Trellis coding is discussed extensively in G. Ungerboeck, "Channel Coding with Multilevel/Phase Signals", *IEEE Transactions on Information Theory*, Vol. IT-28, No. 1, pp. 55–67, January 1982; G. Ungerboeck, "Trellis-Coded Modulation with Redundant Signal Sets—Part I: Introduction,—Part II: State of the Art", *IEEE Communications Magazine*, Vol. 25, No. 2, pp. 5–21, February 1987; and A. R. Caulderbank and N. J. A. Sloane, "New Trellis Codes Based on Lattices and Cosets", *IEEE Transactions on Information Theory*, Vol. IT-33, No. 2, pp. 177–195, March 1987. The Viterbi algorithm is explained in G. D. Forney, Jr., "The Viterbi Algorithm", *Proceedings of the IEEE*, Vol. 61, No. 3, March 1973. Reed-Solomon coding systems are discussed in the Clark, Jr. et al and Lin et al articles cited above.

The error rate performance at the output of the inner, modulation code in concatenated coded systems is highly dependent on signal-to-noise ratio (SNR). Some codes perform better, providing a lower error rate at a low SNR while others perform better at a high SNR. This means that the optimization of the modulation code for concatenated and nonconcatenated coding systems can lead to different solutions, depending on the specified SNR range.

It would be advantageous to provide a data modulation system with high bandwidth efficiency and low power requirements. Such a system should provide a high data rate, with minimal bandwidth occupancy, and very high data reliability. The complexity of a receiver for use with such a system should be minimized, to provide low cost in volume production. Optimally, the system should be able to be implemented using readily available components with as little customization as possible.

The present invention provides a modulation system having the aforementioned advantages. In particular, the method and apparatus of the present invention expand a trellis coded QPSK system to a trellis coded QAM system, without sacrificing data reliability.

SUMMARY OF THE INVENTION

In accordance with the present invention, a method is provided for communicating digital data using QAM transmission. An n-bit QAM constellation pattern is divided into four subsets. Each subset includes N/4 symbol points of the constellation pattern. A different two-bit codeword is assigned to each of the four subsets. A symbol to be transmitted is encoded by processing a first bit of the symbol with a rate $\frac{1}{2}$ binary convolutional encoding algorithm to provide the two-bit codeword assigned to the subset in which the symbol resides in the constellation pattern. The two-bit codeword is mapped with the remaining bits of the symbol to provide a modulation function. The remaining bits correlate the symbol with one of the N/4 symbol points included in the subset defined by the codeword. A carrier is modulated with the modulation function for transmission on a communication channel.

In an illustrated embodiment, the two-bit codeword forms the least significant bits of the modulation function and defines the columns of a matrix of coordinates of the constellation pattern. The remaining bits form the most significant bits of the modulation function and determine the size of the constellation pattern. In a concatenated approach, information bits are first encoded into symbols using, for example, a t-symbol error correcting code, such as a Reed-Solomon code. These encoded symbols are then passed to a trellis encoder which produces the desired modulation for a carrier.

After the modulation function is transmitted, it is recovered at a receiver. The recovered modulation function is pruned to provide a set of metrics corresponding to the subsets and to provide a plurality of bytes representing different conditional determinations of a signal point identified by the remaining bits. The metrics are used in an algorithm (such as the Viterbi algorithm) for decoding a rate $\frac{1}{2}$ binary convolutional code to recover the first bit. The recovered first bit is encoded using a rate $\frac{1}{2}$ binary convolutional encoding algorithm to recreate the codeword. One of the conditional determination bytes is selected in response to the recreated codeword. The selected byte is then combined with the recovered first bit to provide a decoded output.

The present invention also provides apparatus for encoding digital data for QAM transmission. The encoder includes means for parsing a symbol to be transmitted into a first bit and at least one remaining bit. Means are provided for encoding the first bit with a rate $\frac{1}{2}$ binary convolutional encoding algorithm to provide a two-bit codeword that defines one of four subsets of an N-bit QAM constellation pattern, each subset including N/4 symbol points of the constellation pattern. The codeword is mapped with the remaining bits to provide a modulation function. The remaining bits correlate the symbol with one of the N/4 symbol points included in the subset defined by the codeword. Means are provided for modulating a carrier with the modulation function for transmission on a communication channel. An outer encoder can be provided for encoding information bits using an error correcting algorithm to provide the symbol that is parsed by the parsing means.

In an illustrated embodiment, the codeword forms the least significant bits of the modulation function and defines the columns of a matrix of coordinates of said constellation pattern. The remaining bits form the most significant bits of the modulation function and determine the size of the constellation pattern. The encoding means can use a trellis coding algorithm.

Decoding apparatus is also provided in accordance with the invention. A receiver demodulates a received carrier to recover an N-bit QAM modulation function in which a two-bit codeword identifies one of a plurality of QAM constellation subsets and the remaining (N-2) bit portion represents a signal point within said one subset. Means are provided for pruning the recovered modulation function to provide a set of metrics corresponding to said subsets and to provide a plurality of (N-2) bit subgroups representing a plurality of conditional determinations of the signal point identified by the (N-2) bit portion. The metrics are used in an algorithm for decoding a rate ½ binary convolutional code to recover a first bit. The recovered first bit is encoded using a rate ½ binary convolutional encoding algorithm to recreate the codeword. Means are provided for selecting one of the plurality of (N-2) bit subgroups in response to the recreated codeword. The selected subgroup is combined with the recovered first bit to provide a decoded output.

In an illustrated embodiment, the codeword comprises the least significant bits in the modulation function and defines the columns of a matrix of constellation coordinates, with the selected subgroup forming the most significant bits and defining a row of the matrix. The pruning means quantize the recovered N-bit modulation function for each column of a matrix of constellation coordinates and the conditional determinations comprise a best choice for each of the columns with the set of metrics identifying the quality of each choice. The metrics are used in conjunction with a decoder that uses a soft-decision algorithm for decoding convolutional codes.

A concatenated decoder is also provided. In the concatenated embodiment, an outer decoder is provided for decoding the output using a symbol error correcting algorithm. In an illustrated embodiment, the inner decoding algorithm used in the concatenated decoder comprises the Viterbi algorithm. The outer, symbol error correcting algorithm can comprise a Reed-Solomon code. The carrier signal received by the receiver can comprise a high definition television carrier signal.

DETAILED DESCRIPTION OF THE INVENTION

Figure 1:
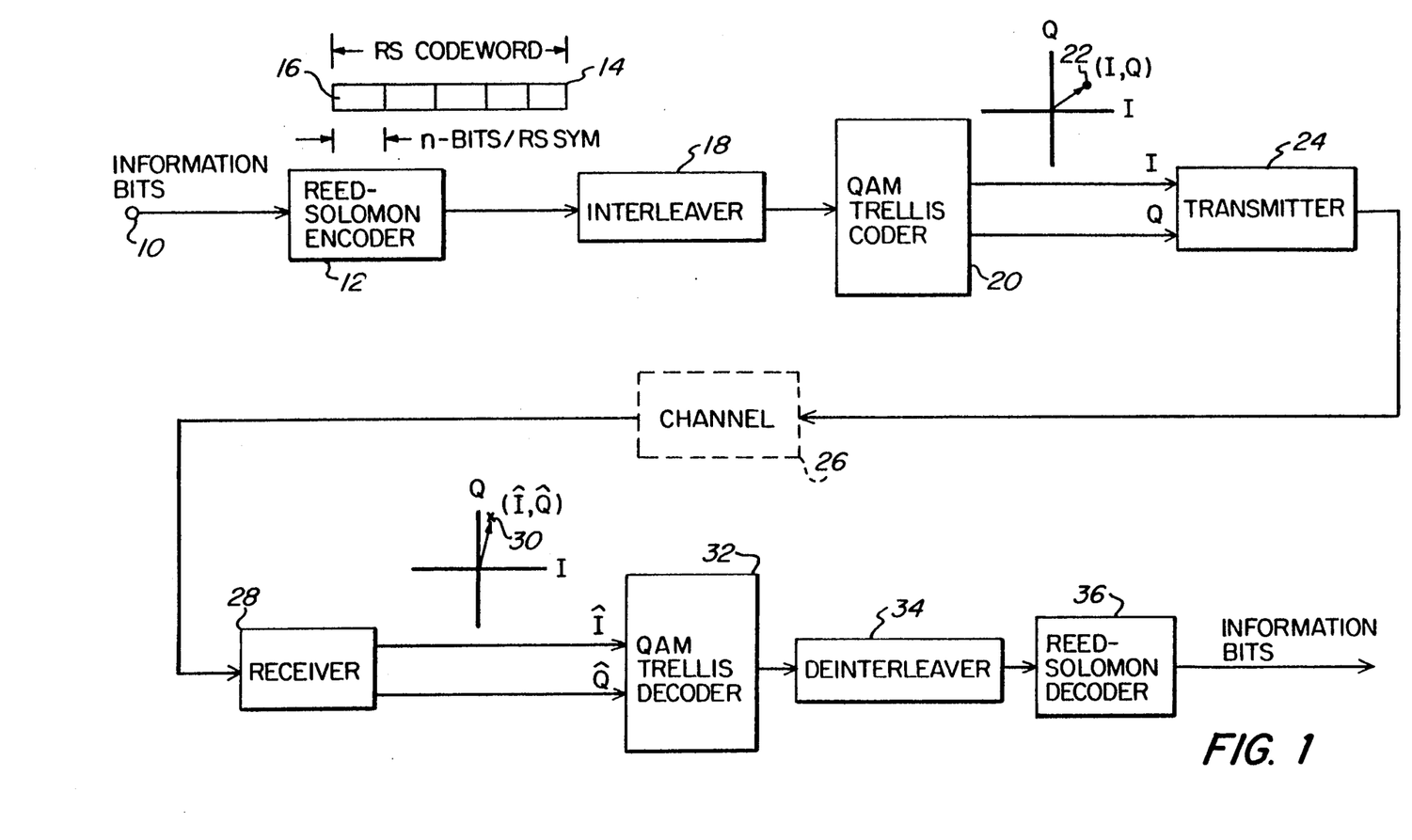
FIG. 1 is a block diagram of a QAM transmission system employing concatenated coding.

FIG. 1 illustrates a concatenated coding system for communicating QAM data. Digital information to be transmitted is input to a symbol error correcting coder 12, such as a Reed-Solomon encoder, via an input terminal 10. Encoder 12 converts the information into a codeword 14, comprising a plurality of successive n-bit symbols 16. While an outer convolutional code could be used for encoder 12, the bursty nature of the errors in a transmission system, the fact that only hard quantized data is available, and the desirability of a high rate code make a Reed-Solomon code, whose symbols are formed from n-bit segments of the binary stream, a good choice for the outer code. Since the performance of a Reed-Solomon code only depends on the number of symbol errors in the block, such a code is undisturbed by burst errors within an n-bit symbol. However, the concatenated system performance is severely degraded by long bursts of symbol errors. Therefore, an interleaver 18 is provided at the output of Reed-Solomon encoder 12, to interleave the symbols (as opposed to individual bits) between coding operations. The intent of the interleaving is to break up the bursts of symbol errors.

The interleaved symbols are input to a QAM trellis coder 20. In accordance with the present invention, coder 20 incorporates a QPSK code into a trellis coded QAM modulation system, as described in greater detail below.

The output of coder 20 comprises symbols representative of coordinates in the real (I) and imaginary (Q) planes of a QAM constellation pattern. One such constellation point 22 is symbolically illustrated in FIG. 1. The symbols are transmitted by a conventional transmitter 24 via a communication channel 26. The communication channel introduces various distortions and delays that corrupt the signal before it is received by a receiver 28. As a result, the coordinate values embodied in the received symbols will not correlate exactly with the transmitted coordinate values, such that a received point 30 will end up on the constellation pattern in a different location than the actual transmitted point 22. In order to determine the correct location for the received point, and thereby obtain the data as actually transmitted, the received data (I, Q) is input to a QAM trellis decoder 32 that uses a soft-decision convolutional decoding algorithm to recover the transmitted information. A decoder in accordance with the present invention is described in greater detail below.

The decoded output from decoder 32 is input to a deinterleaver 34 that reverses the effects of interleaver 18 discussed above. The deinterleaved data is input to a Reed-Solomon decoder 36 for recovery of the original information bits.

In the present invention, a QPSK code is incorporated into the trellis coded QAM modulation system to provide a high data rate, bandwidth efficient system with a moderate bit error rate in low SNR regions of operation. In order to achieve this result, the codewords of the QPSK code and the "uncoded" bits which together define a symbol are uniquely assigned to a QAM constellation. In addition, the received signal is decoded by a combination of a soft-decision decoder with techniques for deciding which constellation points the "uncoded" bits refer to.

Figure 2:
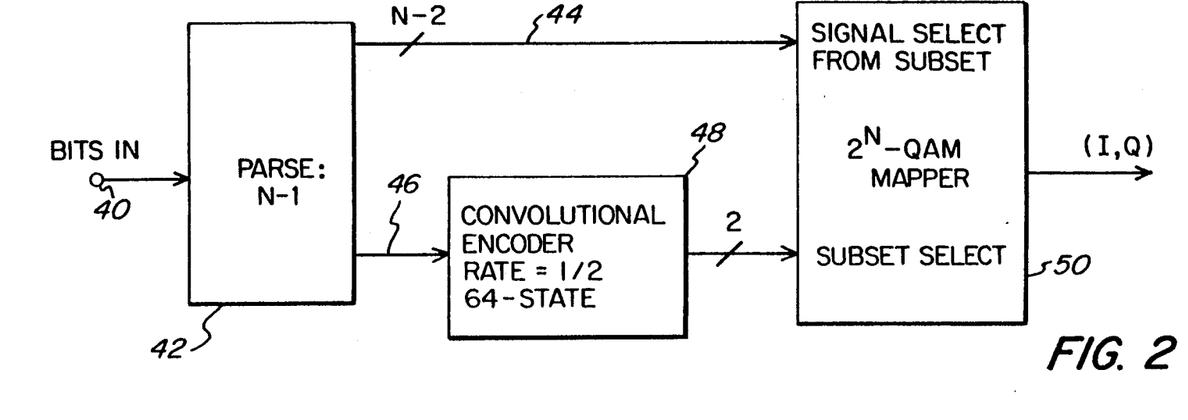
FIG. 2 is a block diagram of a trellis encoder in accordance with the present invention.

FIG. 2 illustrates an encoder in accordance with the present invention. Data bits (e.g., from interleaver 18 -

FIG. 1) are input to a conventional parsing circuit 42 via an input terminal 40. An N-1 bit symbol to be transmitted is parsed into a first bit that is output on line 46 to a convolutional encoder 48. The remaining N-2 "uncoded" bits are output on line 44 to a $2^N$-QAM mapper 50. Convolutional encoder 48 employs a rate $\frac{1}{2}$, 64-state convolutional code, in which the generators are 171 and 133 in octal. The two bits output from encoder 48 and the N-2 uncoded bits (N bits total) are presented to the $2^N$-QAM mapper for use as labels to map the N-bit symbol to a specific constellation point on a QAM constellation. The two "coded" bits output from convolutional encoder 48 are actually QPSK codewords, and are used to select a constellation subset. The uncoded bits are used to select a specific signal point within the constellation subset from the QAM constellation.

For purposes of QAM transmission (encoding), the codewords of the QPSK code and the remaining uncoded bits must be assigned to the QAM constellation. For this purpose, one must describe a labeling of QAM constellation points by a modulation function, $MOD(m) \in R^2$, $$MOD: \{0, 1\}^N \to R^2.$$

The mapping described below has the following desirable features: (1) the consequences of the 90° phase ambiguity of QAM is imposed on the QPSK codewords while the uncoded bits are invariant to the ambiguity (i.e., the 90° phase ambiguity can be dealt with in the same manner as the QPSK system) and (2) the most significant digits control the constellation size (i.e, a nested scheme for 16/32/64 - QAM).

Consider the labeling described by the following matrix, for 16-QAM ($m_5 = m_4 = 0$) (and QPSK, $m_5 = m_4 = m_3 = m_2 = 0$):

```
MOD(m5m4m3m2m1m0)    m1m0
m5m4m3m2      0 0     0 1      1 1      1 0

0 0 0 0    ⎛ +1,+1   -1,+1   -1,-1   +1,-1 ⎞
0 0 0 1    ⎜ +1,-3   +3,+1   -1,+3   -3,-1 ⎟
0 0 1 1    ⎜ -3,-3   +3,-3   +3,+3   -3,+3 ⎟ ,
0 0 1 0    ⎝ -3,+1   -1,-3   +3,-1   +1,+3 ⎠
``` for 32-$QAM$ ($m_5 = 0$) add:

```
MOD(m5m4m3m2m1m0)    m1m0
m5m4m3m2      0 0     0 1      1 1      1 0

0 1 0 0    ⎛ +5,-3   +3,+5   -5,+3   -3,-5 ⎞
0 1 0 1    ⎜ +1,+5   -5,+1   -1,-5   +5,-1 ⎟
0 1 1 1    ⎜ +5,+1   -1,+5   -5,-1   +1,-5 ⎟ ,
0 1 1 0    ⎝ -3,+5   -5,-3   +3,-5   +5,+3 ⎠
``` for 64-$QAM$ add:

```
MOD(m5m4m3m2m1m0)    m1m0
m5m4m3m2      0 0     0 1      1 1      1 0

1 1 0 0    ⎛ +5,+5   -5,+5   -5,-5   +5,-5 ⎞
1 1 0 1    ⎜ +5,-7   +7,+5   -5,+7   -7,-5 ⎟
1 1 1 1    ⎜ -7,-7   +7,-7   +7,+7   -7,+7 ⎟
1 1 1 0    ⎜ -7,+5   -5,-7   +7,-5   +5,+7 ⎟
1 0 0 0    ⎜ -3,-7   +7,-3   +3,+7   -7,+3 ⎟
1 0 0 1    ⎜ -7,+1   -1,-7   +7,-1   +1,+7 ⎟
1 0 1 1    ⎜ +1,-7   +7,+1   -1,+7   -7,-1 ⎟
1 0 1 0    ⎝ -7,-3   +3,-7   +7,+3   -3,+7 ⎠
```

The outputs of the QPSK encoder form the least significant bits (LSBs), $m_1 m_0$, of the modulator input, and select the column of the matrix. The most significant bits (MSBs) determine the constellation size. With no uncoded bits ($m_5 = m_4 = m_3 = m_2 = 0$), QPSK is generated. With 2 uncoded bits, $m_3 m_2$, 16-QAM is generated. With 3 uncoded bits, $m_4 m_3 m_2$, 32-QAM is generated. With 4 uncoded bits, $m_5 m_4 m_3 m_2$, 64-QAM is generated. Furthermore, the effect of rotating the QAM constellation by 90° is to rotate the columns of the matrix, $$00 \to 01 \to 11 \to 10 \to 00;$$

which leaves the rows invariant. This means the labeling of the uncoded bits is unaffected by 0°, 90°, 180° and 270° rotations. The handling of the 90° phase ambiguity at the receiver (decoder) is left solely to the QPSK encoder. Whatever method is used for resolving the ambiguity at the QPSK receiver can be directly incorporated into the QAM system using this labeling. For example, differential encoding of QPSK could be used if the QPSK code is itself rotationally invariant.

Figure 4:
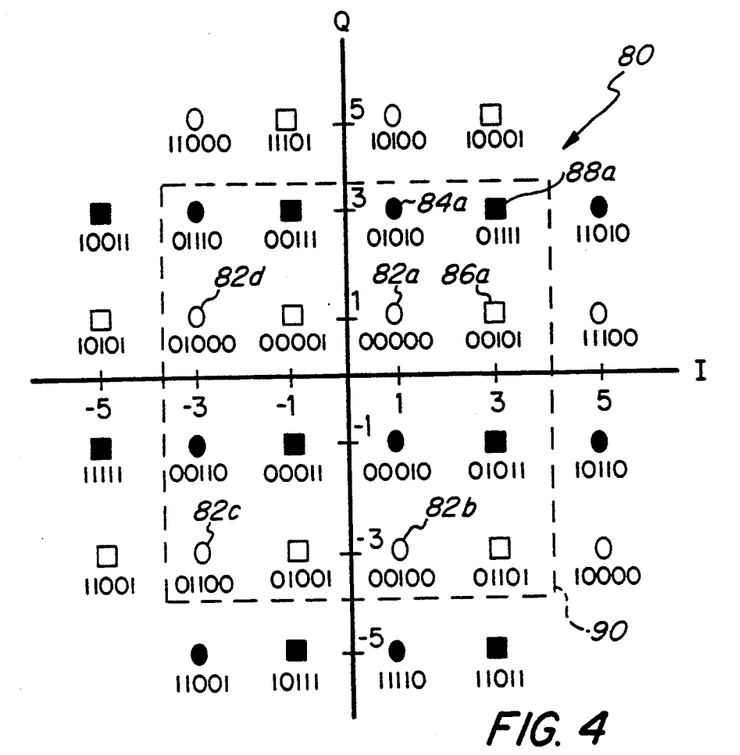
FIG. 4 is an illustration of a QAM constellation pattern divided into subsets in accordance with the present invention.
Figure 5:
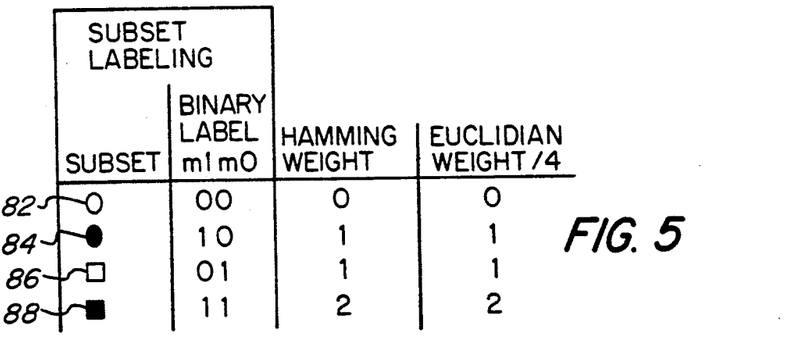
FIG. 5 is a diagram defining the labeling of subsets in the constellation pattern of FIG. 4.
Figure 6:
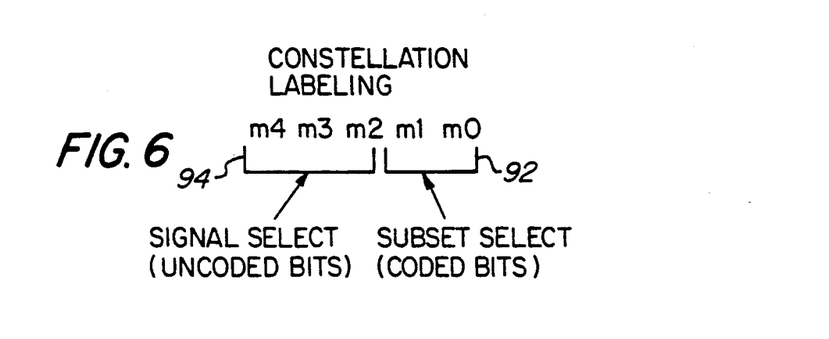
FIG. 6 is a diagram illustrating the labeling of constellation points in the constellation pattern of FIG. 4.

The labeling of a 16-QAM and 32-QAM constellation pattern in accordance with the present invention is illustrated in diagrammatic form in FIG. 4. The constellation patterns, generally designated 80, correspond to the 16-QAM and 32-QAM matrices given above. In particular, for the 16-QAM example, the 16 constellation points are provided in a dashed box 90. The constellation points are divided into four subsets indicated by tokens 82, 84, 86, 88 as shown in FIG. 5. Each subset contains four constellation points. Thus, for subset 82 designated by an open circle, four points 82a, 82b, 82c, and 82d are provided within box 90. The subset itself is defined by the two coded bits (QPSK bits) m0, m1 as indicated at 92 of FIG. 6. For the 16-QAM implementation, the specific point within each subset is identified by the "uncoded" bits m2, m3 as indicated at 94 in FIG. 6. Thus, 82c is defined as the 00 subset and the 011 point within that subset. Each remaining constellation point, such as points 84a, 86a, and 88a, are similarly identified.

For a 32-bit QAM implementation, the additional 16 points outside of dashed box 90 are also included. These points are labeled similarly, with all three bits m2, m3, m4 designated at 94 in FIG. 6 being used. It will be appreciated that the labeling set forth can be expanded to higher levels of QAM.

A feature of the labeling scheme used in accordance with the present invention, as indicated in FIG. 5, is that the Hamming weight of each QPSK symbol equals the Euclidian weight divided by a factor x, where x corresponds to the (minimum distance)$^2$ between constellation points. In the present example, the constellation points illustrated in FIG. 4 are provided at QAM levels of 1, −1, 3, −3, 5, −5 in each of the quadrature channels, and therefore the minimum distance between constellation points is two, such that the Hamming weight is equal to the Euclidian weight divided by 4.

Figure 3:
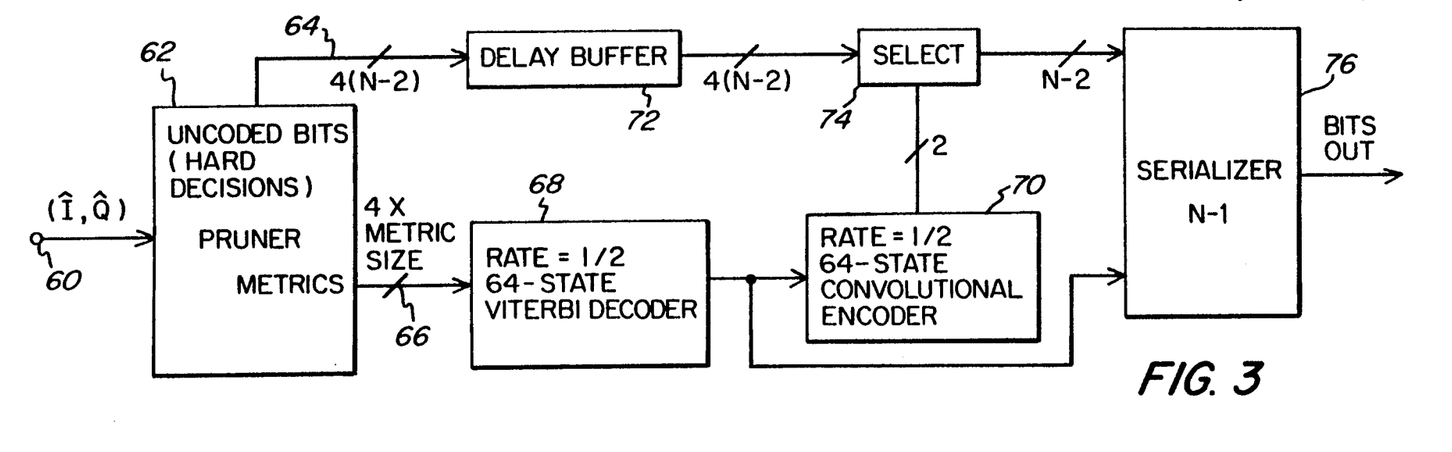
FIG. 3 is a block diagram of a trellis decoder in accordance with the present invention.

FIG. 3 illustrates an implementation of a QAM trellis decoder in accordance with the present invention. The received symbol data is input to a pruner 62 via an input terminal 60. Pruner 62 processes the recovered modulation function to provide a set of metrics corresponding to the subsets defined by the QPSK codewords, and to provide a plurality of (N-2) bit subgroups representing a plurality of conditional determinations of the signal point identified by the transmitted uncoded bits. In particular, four metrics are output on line 66 to a rate ½ 64-state Viterbi decoder 68. Four sets of (N-2) bit conditional determinations are output on line 64.

Pruner 62 can comprise a memory device, such as a programmable read only memory (PROM), that stores a look-up table containing precomputed sets of metrics and conditional determinations for different sets of input values (l, Q). The (l, Q) values are used to address the PROM to output the corresponding stored metrics and determinations. This allows a very high speed pruning operation. The Viterbi decoder uses an accumulated history of the metrics received from the pruner to decode the QPSK codewords.

The Viterbi decoder 68 illustrated in FIG. 3 can be a conventional rate ½ decoder that is available for use with conventional QPSK coding schemes. Thus, in order to implement the decoder of the present invention, a custom Viterbi decoder is not required to decode the trellis codes.

Consider the process of signal detection when a soft-decision QPSK decoder is incorporated in a system employing the previously described QAM modulator. First, in hard-decision detection of QPSK or QAM signals, the received signal, $$y_k = x_k + w_k,$$

is quantized, where the signal, $x_k$, belongs to the QPSK or QAM constellation (i.e., in the range of MOD(m)) and $w_k$ is the noise. The quantization function produces an estimate of both the signal, $x_k$, and the data m, according to the relation, $x_k = \text{MOD}(m)$. For maximum likelihood detection (ML), the log-likelihood function, $-\log(p(y_k|\text{MOD}(m)))$, is minimized over the possible messages, $m \in \{0, 1\}^N$, where $p(y_k|x_k)$ is the conditional probability of receiving $y_k$ given that $x_k$ is transmitted. For random messages, ML detection minimizes the probability of error. The most common method of quantization is nearest (Euclidean) neighbor detection, which satisfies $$\|y_k - x_k\|^2 = \min_{m \in \{0, 1\}^N} \|y_k - \text{MOD}(m)\|^2$$

where $\| \cdot \|^2$ is the Euclidean distance squared (i.e., the sum of the squares). In the case of additive Gaussian noise, nearest neighbor detection is ML.

In coded QPSK and QAM systems, soft decision information should be provided to the decoder for effective decoding of the codeword. This soft-decision information is often described as a symbol metric; this metric indicates the quality of deciding a particular symbol, $x_k = \text{MOD}(m)$, was sent when $y_k$ is received. For nearest neighbor decoding, the metric of choice is:

$$\text{metric}(y_k; m) = \|y_k - \text{MOD}(m)\|^2.$$

In practice, the metric itself is quantized for purposes of implementation. In QPSK, for example, for each possible message, $m_1, m_0 \in \{0, 1\}^2$, the nearest neighbor metric $\|y_k - \text{MOD}(m_1, m_0)\|^2$ is the ML metric for additive Gaussian noise.

In trellis coded QAM modulation, based on a soft decision decodable QPSK code, four symbol metrics must be supplied to the decoder, as well as four conditional hard decisions. For nearest neighbor detection, for each choice of $m_1, m_0 \in \{0, 1\}^2$ $$\text{metric}(y_k; m_1, m_0) = \min_{m_{N-1}, \ldots, m_2 \in \{0, 1\}^{N-2}} \|y_k - \text{MOD}(m_{N-1}, \ldots, m_2, m_1, m_0)\|^2;$$

the conditional hard decisions correspond to the choice of $m_{N-1}, \ldots, m_2$ that obtain the minimum. The process of determining the symbol metrics and conditional hard decisions is known as pruning. In trellis coded QAM, the uncoded bits appear as "parallel" branches of the trellis, and the computation of the symbol metrics and conditional hard decisions act to prune all but the single best branch from the set of parallel edges.

Note that pruning is easily described in terms of the QAM modulation matrix presented above. The pruning operation simply involves quantizing the received symbol, $y_k$, for each column of the matrix. The conditional hard decision is then the best choice for each column and the metric corresponds to the quality of that decision.

Once the pruning operation has been completed, the soft decision information is presented to the decoder of the QPSK code. (During this time, the conditional hard decisions are stored waiting for the QPSK decisions.) The QPSK decoder, using the soft decision information, decodes the QPSK information (i.e., the $m_1, m_0$s). The remaining information (i.e., the $m_{N-1}, \ldots, m_2$s) is then decided in a well known manner using the decoded QPSK information and the previously stored conditional hard decisions.

Note that if the QPSK decoder is ML (for QPSK modulation) then the pruning/QPSK decoding method described is also ML. For example, if the QPSK code is a binary convolutional code with nearest neighbor (i.e., Viterbi) decoding, then the QAM trellis decoding algorithm is also nearest neighbor (i.e., finds the closest codeword to the received sequence).

In the embodiment illustrated in FIG. 3, the metrics output from pruner 62 are decoded by decoder 68 to recover a single bit that corresponds to the single bit output on line 46 in the encoder of FIG. 2. This bit is re-encoded with a rate ½ 64-state convolutional encoder 70 (identical to encoder 48 in FIG. 2) to recreate the two-bit QPSK codeword. The recreated codeword is used to select one of the four (N-2) bit subgroups output from the pruner, after the subgroups have been delayed by a delay buffer 72 for an amount of time equal to the delay introduced by decoder 68. The selected (N-2) bit subgroup is then combined with the recovered single bit from decoder 68 in a serializer 76, to provide a trellis decoded output.

As noted in connection with FIG. 1, the decoded output may exhibit a modest symbol error rate that must be further improved by an outer decoder. Thus, further processing of the decoded output, by deinterleaver 34 and a Reed-Solomon outer decoder 36 (FIG. 1) is used to recover the original information bits.

An estimate of the output bit error rate, with a given input symbol error rate, for a t error-correcting, Reed-Solomon code can be easily computed. An (extended) Reed-Solomon code, over the finite field with $q = 2^l$, has parameters, ($n_{RS}$, k, t), where the blocklength, $n_{RS} \leq q+1$, the dimension, $k = n_{RS} - 2t$, and the error-correction capability is t errors. For a memoryless, symbol error channel with input symbol error rate, $p_{in}$, the output symbol error rate is bounded by:

$$p_{out} \leq (1/n_{RS}) \sum_{i=t+1}^{n_{RS}} \binom{n_{RS}}{i} (1 - p_{in}^{n_{RS}-i}) p_{in}^{i} \min(i + t, n_{RS}).$$

Then, the output bit error rate is approximated by the formula:

$$P_b \approx P_{out} 2^{l-1}/(2^l - 1)$$

Also, if the l bit symbols of the Reed-Solomon code are composed of smaller, n bit symbols (e.g., the decoded symbols of a trellis coded QAM modulation) then the input error rate is:

$$p_{in} \approx 1 - (1 - p_{mod})^{1/n}$$

where $p_{mod}$ is the n bit symbol error rate. To guarantee a "memoryless" channel when coded modulation is employed, the use of interleaving is required.

Figure 7:
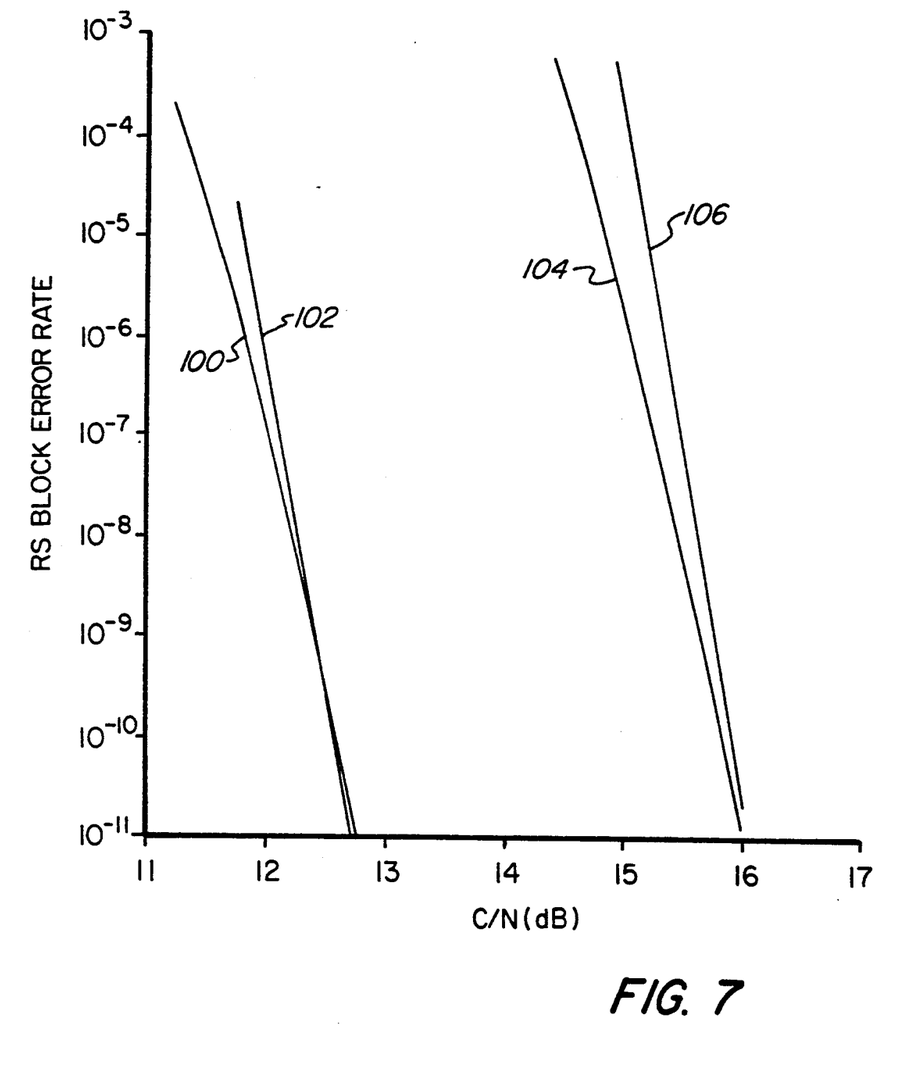
FIG. 7 is a graph illustrating the performance of a concatenated coding scheme in accordance with the present invention as compared to a prior art coded QAM scheme.

FIG. 7 illustrates the performance of two concatenated systems, one employing conventional rate ⅔ trellis codes and decoding, and the other using the rate ½ QPSK implementation of trellis coded QAM in accordance with the present invention. The graph of FIG. 7 plots Reed-Solomon block error rate against the carrier-to-noise ratio (CNR) in the received signal. A block error (or codeword error) block. Curve 100 represents the performance of a concatenated Reed-Solomon trellis coded 16-QAM system in accordance with the present invention, using a rate ½, 64-state decoder. Curve 104 represents the performance of a similar system using trellis coded 32-QAM. Curve 102 represents the performance of a conventional trellis coded 16-QAM, rate ⅔, 16-state decoder. Curve 106 represents the performance of a conventional trellis coded 32-QAM rate ⅘, 16-state decoder.

The curves of FIG. 7 were determined by using trellis coding simulation results to estimate the probability of an m-bit Reed-Solomon symbol being in error, $P_{RSsym}$, and then calculating the probability of a Reed-Solomon block error in accordance with the following formula:

$$P_{block} = \sum_{i=t+1}^{L} \binom{L}{i} P_{RSsym}^{i} (1 - P_{RSsym})^{L-i}$$

where L is the Reed-Solomon block length (number of m-bit symbols per block) and t is the number of Reed-Solomon symbol errors that can be corrected per block. The 16-QAM system uses 116, 8-bit symbols per block, and the 32-QAM system uses 155, 8-bit symbols per block. Both Reed-Solomon codes can correct up to five, 8-bit Reed-Solomon symbols per block.

The curves in FIG. 7 show that if it is desired or necessary to operate the system below a certain CNR, then the trellis coding approach of the present invention, represented by curves 100, 104, is clearly the correct choice. Even at higher CNRs, however, the trellis coding approach of the present invention may still be a better choice, because the trellis decoder apparatus can be produced in a more cost effective manner using a conventional QPSK Viterbi decoder chip.

It should now be appreciated that the present invention provides a practical system for digital transmission of power and band limited signals, such as compressed high definition television signals. A coded modulation scheme based on codes for QPSK modulation is directly incorporated into a QAM based modulation system, forming trellis coded QAM. This provides an easily implementable structure that is both efficient in bandwidth and data reliability.

Although the invention has been described in connection with specific embodiments thereof, those skilled in the art will appreciate that numerous adaptations and modifications may be made thereto without departing from the spirit and scope of the invention as set forth in the claims.

What is claimed is:

1. A method for communicating digital data using QAM transmission comprising the steps of:
   dividing an N-bit QAM constellation pattern into four subsets, each subset including N/4 symbol points of said constellation pattern;
   assigning a different two-bit codeword to each of said four subsets;
   encoding a symbol to be transmitted by processing a first bit of said symbol with a rate ½ binary convolutional encoding algorithm to provide the two-bit codeword assigned to the subset in which said symbol resides in said constellation pattern;
   mapping said two-bit codeword with the remaining bit(s) of said symbol to provide a modulation function, wherein said two-bit codeword forms the least significant bits of said modulation function and defines the columns of a matrix of coordinates of said constellation pattern, and said remaining bit(s) form the most significant bits of said modulation function, correlate said symbol with one of the N/4 symbol points included in the subset defined by said codeword and determine the size of said constellation pattern; and
   modulating a carrier with said modulation function for transmission on a communication channel.

2. A method in accordance with claim 1 wherein said digital data comprises information bits and said symbol is provided by encoding at least a portion of said information bits using an error correcting encoding algorithm.

3. A method in accordance with claim 2 wherein said convolutional encoding step uses a trellis coding algorithm.

4. A method for communicating digital data using QAM transmission comprising the steps of:
   dividing an N-bit QAM constellation pattern into four subsets, each subset including N/4 symbol points of said constellation pattern;
   assigning a different two-bit codeword to each of said four subsets;
   encoding a symbol to be transmitted by processing a first bit of said symbol with a rate ½ binary convolutional encoding algorithm to provide the two-bit codeword assigned to the subset in which said symbol resides in said constellation pattern;
   mapping said two-bit codeword with the remaining bits of said symbol to provide a modulation function, wherein said remaining bits correlate said symbol with one of the N/4 symbol points included in the subset defined by said codeword;
   modulating a carrier with said modulation function for transmission on a communication channel;
   receiving said carrier at a receiver;

demodulating the received carrier at said receiver to recover said modulation function;

pruning the recovered modulation function to provide a set of metrics corresponding to said subsets and to provide a plurality of bytes representing different conditional determinations of a signal point identified by the remaining bits;

using said metrics in an algorithm for decoding a rate ½ binary convolutional code to recover said first bit;

encoding the recovered first bit using a rate ½ binary convolutional encoding algorithm to recreate said codeword;

selecting one of said plurality of bytes representing different conditional determinations in response to said recreated codeword; and combining said selected byte with the recovered first bit to provide a decoded output.

5. A method in accordance with claim 4 wherein said digital data comprises information bits, said method comprising the further steps of:

encoding at least a portion of said information bits using an error correcting encoding algorithm to provide said symbol to be transmitted; and further decoding said decoded output using a symbol error correcting decoding algorithm.

6. A method in accordance with claim 4 wherein said algorithm for decoding is the Viterbi algorithm.

7. Apparatus for encoding digital data for QAM transmission comprising:

means for parsing a symbol to be transmitted into a first bit and at least one remaining bits;

means for encoding said first bit with a rate ½ binary convolutional encoding algorithm to provide a two-bit codeword that defines one of four subsets of symbol points in an N-bit QAM constellation pattern, each subset including N/4 symbol points of said constellation pattern;

means for mapping said codeword with said remaining bit(s) to provide a modulation function, wherein said codeword forms the least significant bits of said modulation function and defines the columns of a matrix of coordinates of said constellation pattern, and said remaining bit(s) correlate said symbol with one of the N/4 symbol points included in the subset defined by said codeword and determine the size of said constellation pattern; and means for modulating a carrier with said modulation function for transmission on a communication channel.

8. Apparatus in accordance with claim 7 further comprising an outer encoder for encoding information bits using an error correcting encoding algorithm to provide said symbol.

9. Apparatus in accordance with claim 7 wherein said encoding means use a trellis coding algorithm.

10. Apparatus for decoding QAM symbol data comprising:

means for demodulating a received carrier to recover an N-bit QAM modulation function in which a two-bit codeword identifies one of a plurality of QAM constellation subsets and the remaining (N-2) bit portion represents a signal point within said one subset;

means for pruning the recovered modulation function to provide a set of metrics corresponding to said subsets and to provide a plurality of (N-2) bit subgroups representing a plurality of conditional determinations of the signal point identified by the (N-2) bit portion;

decoder means for using said metrics in an algorithm for decoding a rate ½ binary convolutional code to recover a first bit;

means for encoding the recovered first bit using a rate ½ binary convolutional encoding algorithm to recreate said codeword;

means for selecting one of said plurality of (N-2) bit subgroups in response to said recreated codeword; and means for combining the selected subgroup with the recovered first bit to provide a decoded output.

11. Apparatus in accordance with claim 10 wherein said codeword comprises the least significant bits in said modulation function and defines a column of a matrix of constellation coordinates, with the selected subgroup forming the most significant bits and defining a row of said matrix.

12. Apparatus in accordance with claim 10 wherein said pruning means quantize the recovered N-bit modulation function for each column of a matrix of constellation coordinates and said conditional determinations comprise a best choice for each of said columns with the set of metrics identifying the quality of each choice.

13. Apparatus in accordance with claim 10 wherein said decoding means comprise a decoder that uses a soft decision algorithm for decoding convolutional codes.

14. Apparatus in accordance with claim 10 further comprising:

an outer decoder for decoding said output using a symbol error correcting algorithm, whereby the combination of said decoder means and said outer decoder form a concatenated decoder.

15. A concatenated decoder in accordance with claim 14 wherein said decoding algorithm comprises the Viterbi algorithm.

16. A concatenated decoder in accordance with claim 15 wherein said symbol error correcting algorithm comprises a Reed-Solomon code.

17. A concatenated decoder in accordance with claim 14 wherein said carrier is an HDTV carrier signal.

18. Apparatus for encoding digital information bits for QAM transmission comprising:

an outer encoder for encoding said information bits using an error correcting encoding algorithm to provide a symbol for transmission;

means for parsing said symbol into a first bit and at least one remaining bit(s);

an inner encoder for encoding said first bit with a rate ½ binary convolutional encoding algorithm to provide a two-bit codeword that defines one of four subsets of symbol points in an N-bit QAM constellation pattern, each subset including N/4 symbol points of said constellation pattern;

means for mapping said codeword with said remaining bit(s) to provide a modulation function, wherein said remaining bit(s) correlate said symbol with one of the N/4 symbol points included in the subset defined by said codeword; and means for modulating a carrier with said modulation function for transmission on a communication channel.

19. A method for communicating digital information bits using QAM transmission comprising the steps of:

dividing an N-bit QAM constellation pattern into four subsets, each subset including N/4 symbol points of said constellation pattern;

assigning a different two-bit codeword to each of said four subsets;

encoding said information bits using an error correcting outer encoding algorithm to provide a symbol for transmission;

encoding a first bit of said symbol using an inner rate ½ binary convolutional encoding algorithm to provide the two-bit codeword assigned to the subset in which said symbol resides in said constellation pattern;

mapping said two-bit codeword with the remaining bit(s) of said symbol to provide a modulation function, wherein said remaining bit(s) correlate said symbol with one of the N/4 symbol points included in the subset defined by said codeword; and modulating a carrier with said modulation function for transmission on a communication channel.

* * * * *